United States Patent [19]
Gayle et al.

[11] Patent Number: 5,092,496
[45] Date of Patent: Mar. 3, 1992

[54] DISPENSER FOR FLOWABLE MATERIALS HAVING A PISTON WITH A FLEXIBLE SEALING RIM

[75] Inventors: Harold R. Gayle, Wilmington, Del.; William T. Wilkinson, Chesapeake City; Mario Boiardi, Queenstown, both of Md.

[73] Assignee: Package Research Corp., Cleveland, Ohio

[21] Appl. No.: 667,288

[22] Filed: Mar. 11, 1991

[51] Int. Cl.⁵ .............................................. G01F 11/00
[52] U.S. Cl. ...................... 222/386; 92/240; 92/247; 92/249; 277/152; 277/212 C; 222/319
[58] Field of Search ................................ 222/386–392, 222/319–321; 92/240, 245, 247–249; 277/138, 152, 165, 206 R, 212 C

[56] References Cited

U.S. PATENT DOCUMENTS

| | | | |
|---|---|---|---|
| 2,840,426 | 6/1958 | Salansky | 92/245 |
| 3,176,595 | 4/1965 | Schwartz | 92/245 |
| 3,266,385 | 8/1966 | Scaramucci | 92/240 X |
| 3,381,863 | 5/1968 | Towns | 92/245 X |
| 4,083,428 | 4/1978 | Ness | 92/240 X |
| 4,203,353 | 5/1980 | Burnham et al. | 92/240 X |
| 4,742,940 | 5/1988 | Wilkinson | 222/386 X |

Primary Examiner—Kevin P. Shaver
Attorney, Agent, or Firm—Connelly & Hutz

[57] ABSTRACT

A dispenser for flowable materials, such as toothpaste, includes a hollow barrel in the form of a tube open at its lower end and closed at its upper end with the flowable material being inserted in the tube. A plunger which is also in the form of a hollow tube having a closed upper end, is telescopically arranged in the barrel. A seal is effected by a hinged peripheral rim on the outer surface of the piston near its upper end. The flow of the material forces the peripheral rim to pivot into sealing contact with the inner surface of the barrel.

6 Claims, 2 Drawing Sheets

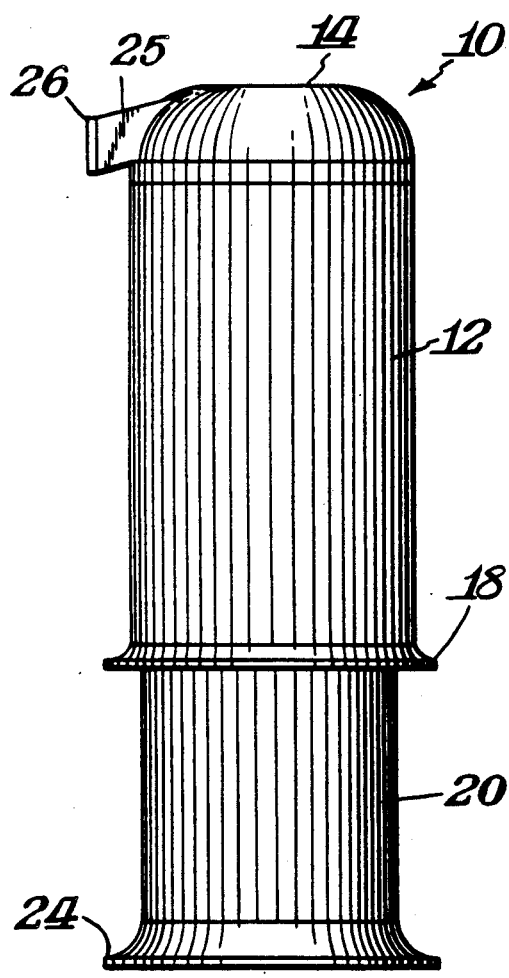
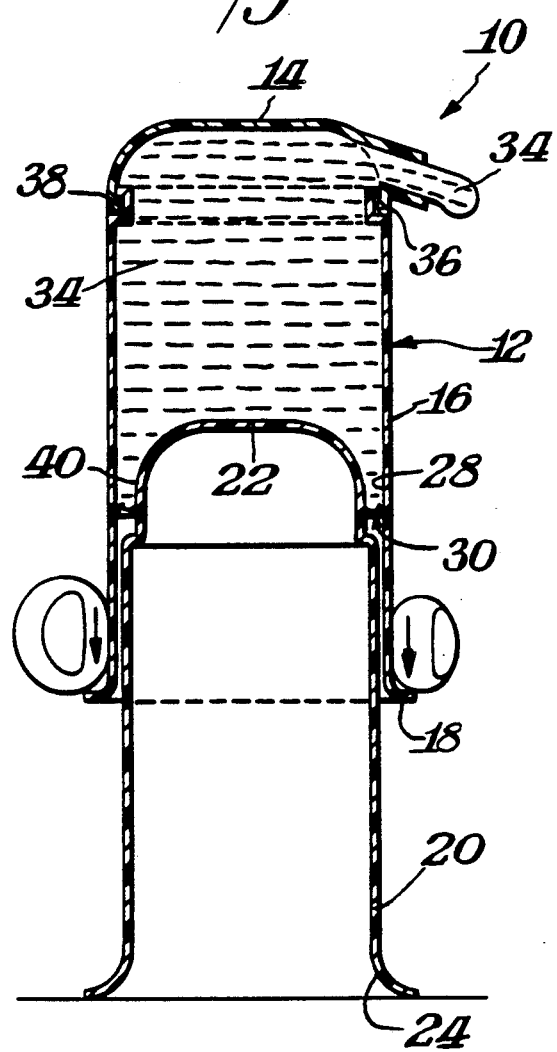

DISPENSER FOR FLOWABLE MATERIALS HAVING A PISTON WITH A FLEXIBLE SEALING RIM

BACKGROUND OF INVENTION

U.S. Pat. No. 4,742,940 discloses a dispenser for flowable materials, such as toothpaste, which includes a hollow barrel open at its lower end and closed at its upper end. A plunger in the form of a hollow tube is telescopically arranged in the barrel to create a material chamber therebetween. In the preferred operation of that device, material is dispensed from a dispensing spout by resting the plunger on a support surface and moving the barrel downwardly so as to cause relative motion of the upper end of the barrel toward the upper end of the piston thereby forcing material out of the dispenser through the dispensing spout. In such a dispenser it is essential that there be a proper seal between the piston and tube. A proper seal is one that will effectively assure that the material will be dispensed only through the dispensing spout. The seal, however, must also permit relative sliding contact between the piston and barrel. In the '940 patent, peripheral contact surfaces in the form of solid ring-like structures are provided on the outer surface of the piston for making sealing engagement with the inner surface of the barrel. The '940 patent also discloses that a sealing material, such as a washer may be provided to the contact surface to further aid in the piston action and assure a sealing contact.

SUMMARY OF INVENTION

An object of this invention is to provide a dispenser of the type disclosed in U.S. Pat. No. 4,742,940 with an improved sealing structure.

A further object of this invention is to provide such a dispenser wherein sealing engagement is enhanced under the influence of the material being dispensed.

In accordance with this invention, the seal is in the form of an annular peripheral rim extending from the outer surface of the piston at its upper end. The rim has a intermediate section of reduced thickness to act as a hinge area. During the downward movement of the barrel with respect to the piston, the material is forced against the peripheral rim causing the rim to pivot downwardly so that an effective seal is created by an upper edge of the rim being maintained by the rim itself in contact with the inner surface of the barrel.

THE DRAWINGS

FIG. 1 is a side elevational view of a dispenser in accordance with this invention;

FIG. 2 is a cross-sectional view in elevation of the dispenser shown in FIG. 1;

DETAILED DESCRIPTION

Figure 3:
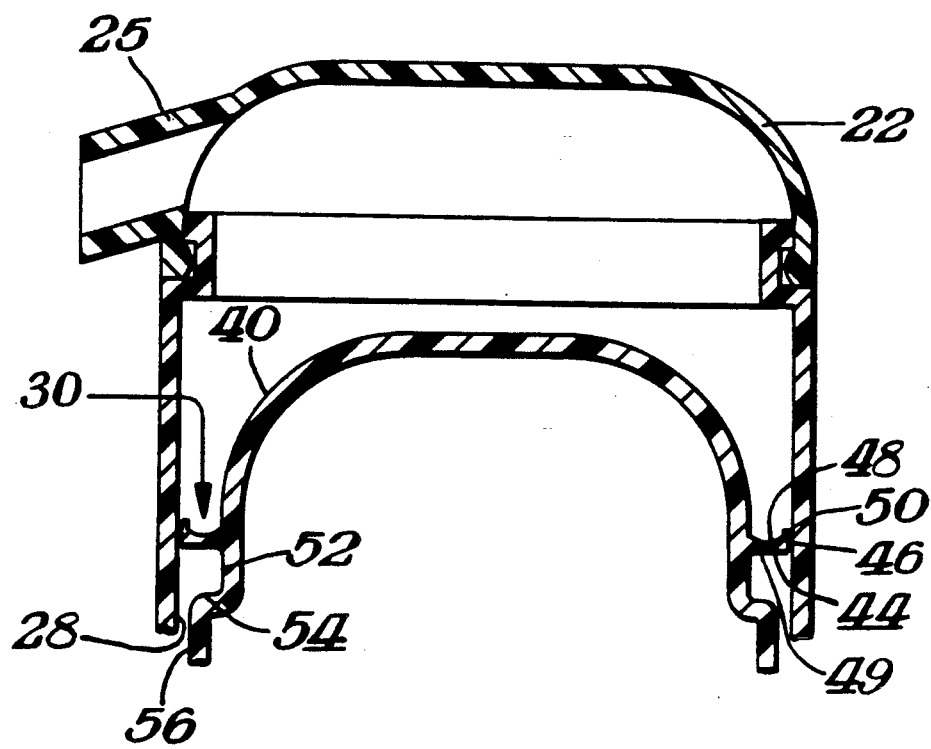
FIG. 3 is a cross-sectional view showing the sealing arrangement for the dispenser in FIGS. 1-2.

The present invention is directed to dispensers for flowable materials, such as toothpaste and other viscous materials. In the preferred practice of the invention, the dispenser is of the type described in U.S. Pat. No. 4,742,940 wherein a dispensing action takes place by moving a barrel downwardly with respect to a piston telescoped within the barrel. In such a dispenser, the piston would be placed on a support surface, such as a countertop or a sink and the user would simply push downwardly to cause a telescopic action whereby the material within the dispenser would be forced outwardly from a dispensing spout. It is to be understood, however, that the invention may be practiced with other types of dispensers including dispensers wherein the telescopic motion is achieved by pushing the piston inwardly into the barrel or outer tube. More particularly, the present invention is directed to the improved sealing structure for such a dispenser.

FIGS. 1-2 illustrate the general structure for a dispenser which may incorporate the novel sealing arrangement. As shown therein, dispenser 10 is formed generally along the same lines as the dispenser in U.S. Pat. No. 4,742,940 except for its sealing structure. Thus, dispenser 10 includes a rigid sleeve or barrel 12 of any suitable shape and preferably in the form of a hollow tube which is open at its lower end and closed at its upper end. The upper end of barrel 12 includes a cap portion 14 which is snapped onto the lower cylindrical portion 16. The open end of barrel 12 is flared as indicated by the reference numeral 18 to provide a convenient surface which may be manipulated by the user pushing the barrel 12 downwardly as illustrated in FIG. 2.

Within barrel 12 is a rigid piston 20 of a shape conforming to the shape of barrel 12. The upper end of piston 20 has a closed end which functions as a piston head 22. Lower end of piston 20 is outwardly flared at its periphery as indicated by the reference numeral 24. Flared end 24 provides stability whereby dispenser 10 may stand upright on the flared end as shown in FIG. 2. Piston or plunger 20 is preferably hollow to minimize manufacturing costs and complications. The invention may be practiced with tubular shapes other than cylinders for the barrel and piston. Additionally, flare 24 may be omitted and piston 20 may be of uniform cross section.

The closed upper end of barrel 12 includes a dispensing spout 25 which communicates with the interior of barrel 12. A closure 26 of any suitable type such as a plug, cap or tape is detachably secured to dispensing spout 25 for permitting the spout to be selectively opened and closed. It is preferred that the closure be permanently attached to barrel 12 at, for example, one end to avoid the possibility of the closure being lost or misplaced.

During assembly of dispenser 10 piston 20 is snapped into the lower open end of barrel 12. Because of the nature of the plastic material used for piston 20 and barrel 12 there is sufficient resiliency to permit such an assembly while still providing the necessary rigidity required for the device. After barrel 12 and piston 20 have been assembled and before cap 14 has been mounted on the cylindrical sleeve portion 14, the flowable material 34 is inserted into the open upper end of barrel 12 while barrel 12 is in its uppermost position with its flare 18 disposed approximately adjacent to the lower portion of boss 40 of piston head 22. In this condition, the material receiving chamber is at its maximum. The material 34 is then inserted until the hollow tube 16 is completely filled with material 34. Next, the cap 14 is coupled onto tube 16 by snapping peripheral flange 36 of cap 14 into groove 38 of tube 16. Device 10 is then ready for final packaging as a commercial item.

Figure 4:
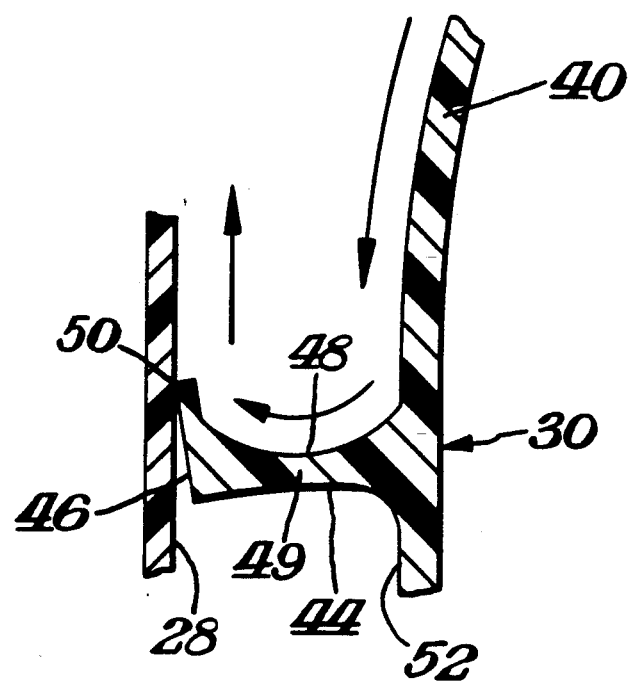
FIG. 4 is an enlarged view of a portion of the sealing arrangement shown in FIG. 3.

FIGS. 3-4 illustrate the novel sealing arrangement of this invention. As shown therein, an annular sealing rim 30 extends outwardly from the periphery of boss 40 of piston 22. Sealing rim 30 includes a cup shaped upper surface 48, which terminates at an outer corner 50. A straight wall 46, is joined to upper corner 50 and is generally disposed parallel to the inner surface 28 of barrel 12. Sealing rim 30 also includes a horizontal lower wall 44 which is perpendicular to outer wall 46. Lower horizontal wall 44 then merges into annular recessed wall 52 which terminates at a horizontal wall 54 which in turn merges into vertical wall 56 disposed parallel to but slightly spaced from barrel inner wall 28.

As best shown in FIG. 4, the intermediate portion 49 of sealing rim 30 is the thinnest portion of sealing rim 30 and acts as a hinge area. In practice, sealing rim 30 would be generally disposed as shown in FIG. 3 with its outer wall 46 making slight contact with inner wall 28 of barrel 12. When, however, barrel 12 is moved downwardly to reduce the chamber which holds material 34, the material 34 is forced to flow around the outer surface of piston head 22 as indicated by the arrow. The downward pressure created by the flowing material acts against sealing rim 30 to cause sealing rim 30 to rotate about its reduced area portion 49 so that upper corner 50 and the portion of outer wall 46 immediately adjacent thereto makes effective sealing area contact with the inner surface 28 of barrel 12. When the downward pushing action is terminated, the components return to their equilibrium or static condition shown in FIG. 3 with sealing rim 30 resuming its normal position. Upon further downward movement of barrel 12, the hinging action is then repeated as illustrated in FIG. 4.

Sealing rim 30 is formed of any suitable material, such as polypropelene capable of bending from the position shown in FIG. 3 to the position shown in FIG. 4 and then returning to its position of FIG. 3 upon the cessation of a downward force. In this manner, the downward application of force controls the extent that upper corner 50 and its proximate portion of vertical wall 46 will contact inner surface 28. Thus, the more that barrel 12 is pushed in a continuous pushing action, the greater will be the seal that is created between sealing rim 30 and inner surface 28. This in turn will make it more difficult to continue applying a downward force. As a result, the sealing action in a sense, acts as a meter to limit the amount of material that would be dispensed by one downward motion. Accordingly, the amount of material is in effect metered for a single use. After the single use of material has been dispensed and the downward force is ceased, the surface seal shown in FIG. 4 returns to the lighter type seal of FIG. 3 which readies the components for the next dispensing operation.

As can be appreciated, sealing rim 30 thereby provides an effective manner of providing a seal between the piston and barrel while effectively facilitating a sliding action between the barrel and its piston until a sufficient amount of material has been dispensed.

What is claimed is:

1. In a dispenser for flowable materials comprising a barrel having an upper end and an open lower end, a dispensing spout at said upper end of said barrel, a plunger telescoped into said barrel, the upper end of said plunger having a piston head spaced from the inner surface of said barrel, a chamber formed between said upper end of said barrel and said upper end of said plunger whereby the flowable material may be inserted in and fill said chamber, and said barrel and said plunger being slidably mounted with respect to each other to vary the size of said chamber whereby the flowable material is caused to be discharged from said dispensing spout when said chamber is made smaller by said upper end of said barrel and said upper end of said plunger being moved toward each other, the improvement being in an annular peripheral sealing rim extending around said plunger below said piston head, said sealing rim having an outer longitudinal surface terminating in a corner at its upper edge, said sealing rim having an upper surface, said sealing rim having a thin portion which comprises hinge means, said corner being on a longitudinal extension of said outer longitudinal surface and positioned upwardly beyond said hinge means, said hinge means being disposed inwardly of said outer longitudinal surface for causing said outer longitudinal surface to pivot downwardly in response to pressure from the flowable material when said chamber is made smaller to thereby create sealing surface contact of said corner and a portion of said outer longitudinal surface with said inner surface of said barrel, and the degree of contact of said outer longitudinal surface increasing as materials continue to be dispensed from said spout.

2. The dispenser of claim 1 wherein said sealing rim in combination with said inner surface of said barrel acts as a metering means for controlling the amount of material dispensed from said spout.

3. The dispenser of claim 1 wherein said upper surface of said sealing rim has a concave shape, said thin portion being at the base of said concave shape, and said sealing rim increasing in thickness outwardly from each side of said base of said concave shape.

4. The dispenser of claim 1 wherein the length of said sealing rim is no greater than the distance between said plunger and said barrel at the location where said sealing rim extends from said plunger.

5. The dispenser of claim 1 wherein said sealing rim has a bottom surface extending perpendicularly from said plunger during the equilibrium condition of said dispenser.

6. The dispenser of claim 5 wherein said dispenser is non-pressurized, and said bottom surface being exposed to the atmosphere through said lower end of said barrel.

* * * * *

REEXAMINATION CERTIFICATE (2458th)

United States Patent [19]

Gayle et al.

[11] B1 5,092,496

[45] Certificate Issued  Jan. 24, 1995

[54] DISPENSER FOR FLOWABLE MATERIALS HAVING A PISTON WITH A FLEXIBLE SEALING RIM

[75] Inventors: Harold R. Gayle, Wilmington, Del.; William T. Wilkinson, Chesapeake City; Mario Boiardi, Queenstown, both of Md.

[73] Assignee: Package Research Corporation, Cleveland, Ohio

Reexamination Request:
No. 90/003,363, Mar. 14, 1994

Reexamination Certificate for:
Patent No.: 5,092,496
Issued: Mar. 3, 1992
Appl. No.: 667,288
Filed: Mar. 11, 1991

[51] Int. Cl.⁶ ............................................ G01F 11/00
[52] U.S. Cl. ............................. 222/386; 92/240; 92/247; 92/249; 222/319; 277/212 C; 277/152

[56] References Cited

U.S. PATENT DOCUMENTS

| | | | |
|---|---|---|---|
| 3,176,595 | 4/1965 | Schwartz | 92/245 |
| 3,266,385 | 8/1966 | Scaramucci | 92/240 X |
| 3,381,863 | 5/1968 | Towns | 92/245 X |
| 3,493,147 | 2/1970 | Ballin | 222/158 |
| 3,840,426 | 6/1958 | Salansky | 92/245 |
| 4,083,428 | 4/1978 | Ness | 92/240 X |
| 4,203,353 | 5/1980 | Burnham et al. | 92/240 X |
| 4,742,940 | 5/1988 | Wilkinson | 222/386 X |
| 4,747,517 | 3/1988 | Hart | 222/327 X |
| 5,020,694 | 6/1991 | Pettengill | 222/386 X |
| 5,038,963 | 8/1991 | Pettengill | 222/137 X |

*Primary Examiner*—Kevin P. Shaver

[57] ABSTRACT

A dispenser for flowable materials, such as toothpaste, includes a hollow barrel in the form of a tube open at its lower end and closed at its upper end with the flowable material being inserted in the tube. A plunger which is also in the form of a hollow tube having a closed upper end, is telescopically arranged in the barrel. A seal is effected by a hinged peripheral rim on the outer surface of the piston near its upper end. The flow of the material forces the peripheral rim to pivot into sealing contact with the inner surface of the barrel.

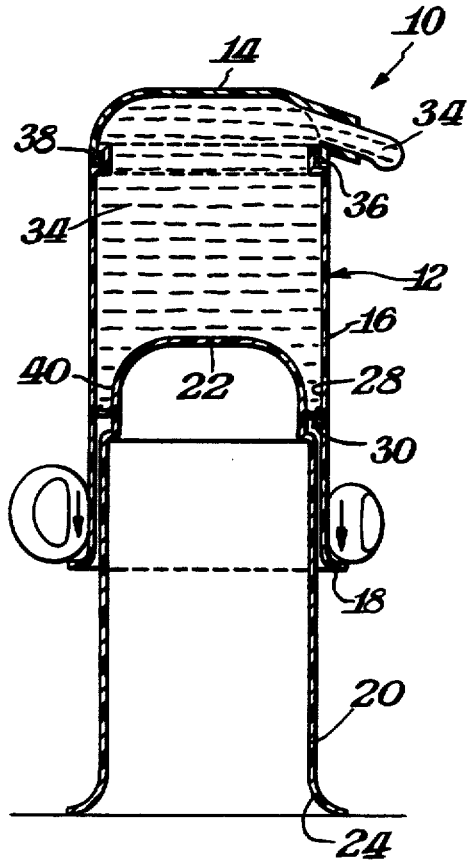

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–6 is confirmed.

New claims 7–11 are added and determined to be patentable.

*7. The dispenser of claim 1 wherein said barrel is of cylindrical shape over its length from said lower end to said chamber.*

*8. The dispenser of claim 1 wherein said barrel is a rigid cylinder of uniform inside diameter, said annular peripheral sealing rim being of circular shape to conform to said inner surface of said barrel, and said spout being a sidewards directed spout.*

*9. The dispenser of claim 1 wherein said sealing rim is unsupported below said thin portion hinge means to permit the degree of contact of said corner with said inner surface to increase as materials continue to be dispensed from said spout.*

*10. The dispenser of claim 9 wherein said sealing rim is of lesser dimension than said inner surface in the horizontal plane to initially space said longitudinal surface and said corner away from said inner surface, and a portion of said longitudinal surface below and remote said corner being spaced from said inner surface and remaining spaced from said inner surface as materials continue to be dispensed from said spout.*

*11. The dispenser of claim 1 wherein said flowable material is toothpaste.*

* * * * *